US012537988B2

(12) United States Patent
Guo et al.

(10) Patent No.: US 12,537,988 B2
(45) Date of Patent: Jan. 27, 2026

(54) VIDEO TRANSMISSION QUALITY EVALUATION AND OPTIMIZATION METHOD AND SYSTEM BASED ON USER BEHAVIOR

(71) Applicant: PEKING UNIVERSITY, Haidian District Beijing (CN)

(72) Inventors: Zongming Guo, Haidian District Beijing (CN); Han Hu, Haidian District Beijing (CN); Xinggong Zhang, Haidian District Beijing (CN); Sheng Cheng, Haidian District Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 18/870,079

(22) PCT Filed: Nov. 8, 2022

(86) PCT No.: PCT/CN2022/130477
§ 371 (c)(1),
(2) Date: Nov. 27, 2024

(87) PCT Pub. No.: WO2023/240909
PCT Pub. Date: Dec. 21, 2023

(65) Prior Publication Data
US 2025/0324123 A1 Oct. 16, 2025

(30) Foreign Application Priority Data
Jun. 14, 2022 (CN) .......................... 202210671235.8

(51) Int. Cl.
*H04N 21/2662* (2011.01)
*H04N 21/442* (2011.01)

(52) U.S. Cl.
CPC ... *H04N 21/2662* (2013.01); *H04N 21/44204* (2013.01)

(58) Field of Classification Search
CPC ..................... H04N 21/2662; H04N 21/44204
See application file for complete search history.

(56) References Cited

U.S. PATENT DOCUMENTS 8,489,923 B1 *   7/2013  Lakshminarayanan ......................
                                                    H04L 12/2812
                                                          714/48
9,819,566 B1 *  11/2017  Ganjam ............. H04N 21/6547
(Continued)

FOREIGN PATENT DOCUMENTS

CN          103108257 A      5/2013
CN          105897736 A      8/2016
(Continued)

OTHER PUBLICATIONS

International Search Report from PCT/CN2022/130477.
(Continued)

*Primary Examiner* — Nicholas T Corbo
(74) *Attorney, Agent, or Firm* — Dilworth & Barrese, LLP.; Michael J. Musella, Esq.

(57) ABSTRACT

Provided in the present invention are a video transmission quality evaluation and optimization method and system based on user behavior. The method comprises: establishing an exit rate model according to a session duration of a user watching a video, and a playing state of each second; calculating a state transition probability according to playing states of every two adjacent seconds; according to the transition probability and the exit rate, calculating mathematical expectation values of stay durations corresponding to positions, network connection types, CDNs and bitrates within different time periods; and according to a stay duration expectation, for the position and a network connection type of a given user, selecting a bitrate and a CDN which allow the longest stay duration expectation. By means of the present invention, a model is established on the basis of two (Continued)

(1)

(2)

user behavior metrics, i.e. an exit rate and a stay duration, and video transmission quality scores corresponding to different bitrates and CDNs are evaluated for the specific positions and network connection types of different users, such that a bitrate and a CDN which can optimize the viewing experience of a user are accurately given, and the video transmission quality can be greatly improved.

10 Claims, 2 Drawing Sheets

(56) References Cited

U.S. PATENT DOCUMENTS

| | | | | |
|---|---|---|---|---|
| 2022/0109910 A1* | 4/2022 | Yamagishi | ....... | H04N 21/44204 |
| 2022/0174353 A1* | 6/2022 | Yamagishi | ......... | H04N 21/6125 |

FOREIGN PATENT DOCUMENTS

| | | | |
|---|---|---|---|
| CN | 106488325 A | 3/2017 | |
| CN | 107493519 A | 12/2017 | |
| CN | 109286855 A | 1/2019 | |
| CN | 110958491 A | 4/2020 | |
| CN | 111064954 A | 4/2020 | |
| CN | 112954414 A | 6/2021 | |
| CN | 115278354 A | 11/2022 | |
| WO | 2012167416 A1 | 12/2012 | |
| WO | WO-2023169262 A1 * | 9/2023 | ....... H04N 21/44004 |

OTHER PUBLICATIONS

Written Opinion from PCT/CN2022/130477.
First Office Action of CN Family Application Jan. 30, 2024.
Notice of Allowance of CN Family Application dated Jun. 5, 2024.

* cited by examiner

| CDN Service Provider | DT | ANN | CFA | Proposed |
|---|---|---|---|---|
| Bd | 14.98 | 10.92 | 7.44 | 5.63 |
| Jd | 13.97 | 9.47 | 7.01 | 6.60 |
| Hw | 13.44 | 11.89 | 7.51 | 7.72 |
| Ws | 13.57 | 9.11 | 8.14 | 5.27 |

Comparison Methods
(1)

| Resolution Level | DT | ANN | CFA | Proposed |
|---|---|---|---|---|
| 480p | 14.05 | 10.36 | 6.95 | 4.68 |
| 540p | 13.09 | 10.70 | 7.88 | 7.02 |
| 720p | 12.70 | 10.42 | 8.85 | 4.60 |
| 1080p | 13.60 | 7.96 | 7.71 | 6.01 |

Comparison Methods
(2)

VIDEO TRANSMISSION QUALITY EVALUATION AND OPTIMIZATION METHOD AND SYSTEM BASED ON USER BEHAVIOR

TECHNICAL FIELD

The present invention belongs to the technical field of video streaming, and specifically relates to video transmission quality evaluation and optimization method and system based on user behavior metrics.

BACKGROUND ARTS

The number of users of online video is increasing significantly, and the demand for high-quality video streaming services is becoming increasingly urgent. Users expect a smooth and high-quality viewing experience, and they feel frustrated by failed access requests, slow loading speeds, frequent buffering events, and blurry videos. Only products and services that meet the needs of online video users can gain their favor and widespread use. To adapt to different network environments and optimize video streaming quality, the primary approach is to predict and evaluate the actual network quality. This involves designing adaptive algorithms for video bitrate and CDN (Content Delivery Network) to optimize video bitrate and network link quality. This helps to avoid exceeding network capacity, which can lead to increased packet loss and latency, thereby affecting video quality.

In existing technologies, methods for evaluating and optimizing the quality of video streaming primarily use metrics such as initial frame delay, buffering duration, and frequency as reference variables for adjusting video bitrate and CDN. The specific adjustment principles are as follows: select the CDN with the lowest average initial frame delay, buffering duration, and frequency; if the initial frame delay, buffering duration, and frequency remain high, reduce the video bitrate; if the initial frame delay, buffering duration, and frequency are low, increase the video bitrate.

However, metrics such as initial frame delay, buffering duration, and frequency do not accurately reflect the user's real experience. During real-time video streaming, it is also challenging to obtain users' actual quality of experience through subjective surveys. Even if adjustments to video bitrate and CDN result in lower average initial frame delay, buffering duration, and frequency, this does not necessarily mean that the user's viewing experience has improved. Thus, existing methods for evaluating and optimizing video streaming quality cannot effectively and accurately enhance video streaming quality.

User behavior refers to the activities of users interacting with the player interface. User behavior metrics include exit rate, stay duration, and viewing duration. Compared to metrics such as initial frame delay, buffering duration, and frequency, user behavior metrics can more intuitively reflect the user's genuine viewing experience. Additionally, they do not require subjective experiments for collection, making them a better reference variable for assessing user viewing experience.

SUMMARY OF THE INVENTION

The present invention provides a method and system for video transmission quality evaluation and optimization based on user behavior, aimed at accurately and effectively addressing issues in video transmission.

One aspect of the present invention provides a method for video streaming quality evaluation and optimization, comprising:
Acquiring the session duration of users watching online videos under various positions, network connection types, CDNs, and bitrates during different time periods, as well as the playing state for each second within the session, specifically whether each second is in a buffering state;
Establishing an exit rate model based on the session duration and the playing state for each second;
Calculating the state transition probabilities for play-to-play, play-to-buffering, buffering-to-play, and buffering-to-buffering based on the playing states of every two adjacent seconds;
Calculating the mathematical expectation values of stay durations corresponding to various positions, network connection types, CDNs, and bitrates during different time periods based on the state transition probabilities and exit rates, referred to as stay duration expectations;
Selecting the bitrate and CDN that maximize the stay duration expectation for a given user's position and network connection type based on the stay duration expectations.

Another aspect of the present invention provides a video streaming quality evaluation and optimization system, comprising:
A modeling module configured to acquire the session duration of users watching online videos and to determine whether each second within the session is in a buffering state, thereby establishing an exit rate model for all video sessions;
An evaluation module configured to differentiate the playing states for each second within sessions under various positions, network connection types, CDNs, and bitrates during different time periods, thereby calculating the corresponding state transition probabilities and the mathematical expectation values of stay durations;
An optimization module configured to select the bitrate and CDN that maximize the stay duration expectation for a given user's position and network connection type.

The method and system for video transmission quality evaluation and optimization based on user behavior provided by the present invention establish a model based on two user behavior metrics: exit rate and stay duration. This overcomes the shortcomings of metrics such as initial frame delay, buffering duration, and frequency, which fail to reflect the user's true viewing experience, while also avoiding the additional costs associated with conducting subjective experiments. By calculating the transition probabilities and stay duration expectations corresponding to various positions, network connection types, CDNs, and bitrates during different time periods, the invention distinguishes different network environments. It evaluates the video streaming quality scores for various bitrates and CDNs specific to different users' positions and network connection types, thereby accurately identifying the bitrate and CDN that optimize the user viewing experience. Thus, the method and system for video transmission quality evaluation and optimization based on user behavior provided by the present invention can significantly improve video streaming quality.

DETAILED DESCRIPTION OF THE INVENTION

To make the objectives, technical solutions, and advantages of the embodiments of the present invention clearer, the following describes the technical solutions of the embodiments of the present invention in conjunction with the accompanying drawings. It is evident that the described embodiments are part of the embodiments of the present invention and do not represent all possible embodiments. All other embodiments that can be derived by those skilled in the art without any creative effort based on the embodiments of the present invention fall within the scope of protection of the present invention.

Figure 1:
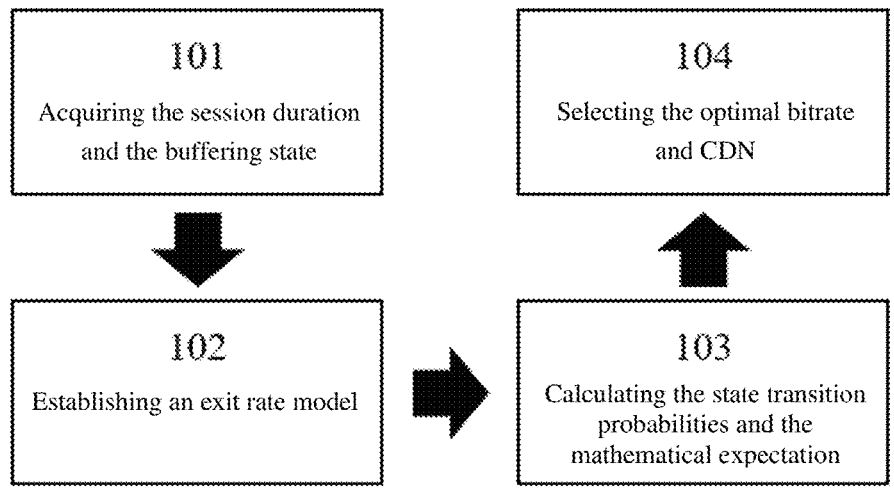
FIG. 1 is a flowchart illustrating the method for video transmission quality evaluation and optimization provided by the embodiment of the present invention.

The embodiment of the present invention addresses the issue that existing video transmission quality evaluation and optimization method and system cannot accurately and effectively enhance video transmission quality. It provides a method for video streaming quality evaluation and optimization based on user behavior metrics. FIG. 1 is a flowchart illustrating the method for video streaming quality evaluation and optimization provided by this embodiment. The specific steps of the method are as follows:

Step 101: Acquiring the session duration of users watching online videos and the playing state for each second within the session, specifically whether each second is in a buffering state.

Specifically, it is necessary to record the session duration when the user finishes watching the online video or actively exits the application or webpage. Based on the playing state for each second during the viewing process, each second's state is labeled as either "playing" or "buffering".

In this embodiment, for the playing state of each second within the session, if the buffering duration within that second exceeds a certain threshold, such as 0.3 seconds, the state is labeled as "buffering"; if the buffering duration does not exceed 0.3 seconds, the state is labeled as "playing."

Step 102: Establishing an exit rate model based on the session duration and the playing state for each second.

Since user exit behavior is entirely determined by the users themselves and is directly influenced by the playing state, but not directly affected by the network environment, this embodiment establishes the exit rate model based on the playing state chain.

In specific implementation, the user exit rate at the second t is denoted as $SER_t$. According to the law of large numbers in data analysis, the exit rate can be estimated using the frequency of exit behavior. The value of $SER_t$ is related to the total number of session samples $S_0$, the number of samples $S_{t-1}$ that have not exited by the second (t−1), and the number of samples $S_t$ that have not exited at the second t, satisfying the following formula (1):

$$SER_t = \frac{s_{t-1} - s_t}{s_0} \quad (1)$$

In this embodiment, regression analysis is utilized to express the relationship between the exit rates of two adjacent seconds and the state transition between these two seconds ($s_{t-1}$, $s_t$), which satisfies the following formula (2):

$$SER_t = k(s_{t-1}, s_t)SER_{t-1} + b(s_{t-1}, s_t) \quad (2)$$

Where $s_t$ represents the playing state of the user while watching the online video for each second, either "playing" or "buffering." Regardless of the type of state transition, the value of $k(s_{t-1}, s_t)$ is relatively fixed, while the value of $b(s_{t-1}, s_t)$ is fixed only when the type of state transition is determined. Therefore, the exit rates of the two adjacent seconds satisfy the following formula (3):

$$SER_t = \gamma SER_{t-1} + b(s_{t-1}, s_t) \quad (3)$$

In this embodiment, the values of the parameters $\gamma$ and b are calculated using a linear regression method.

For any playing state chain $c = \langle s_0, s_1, s_2, \ldots, s_t, \ldots \rangle$, the exit rate $SER_t$ satisfies the following formula (4):

$$SER_t = \sum_{i=1}^{t} \gamma^{i-1} b(s_{t-i}, s_{t-i+1}) \quad (4)$$

Step 103: Calculating the corresponding state transition probabilities and the mathematical expectation values of stay durations, based on whether each second within the session is in a buffering state under various positions, network connection types, CDNs, and bitrates during different time periods.

The transition probability $P_T(i, j)$ between any two states i and j is related to the number of samples $N(i, j)$ that contain the subsequence (i,j), as well as the sum of the aforementioned samples (those containing the subsequence (i,j)) and the number of samples transitioning to a non-j state $N(i)$, satisfying the following formula (5):

$$P_T(i, j) = \frac{N(i, j)}{N(i)} \quad (5)$$

Since the transition probabilities are entirely determined by the network environment and are influenced by factors such as time periods, positions, network connection types, CDNs, and bitrates, this embodiment distinguishes network environments based on the transition probabilities.

In any given network environment, for any playing state chain $c = \langle s_0, s_1, s_2, \ldots, s_t, \ldots \rangle$, the generation probability $P_C(c)$ satisfies the following formula (6):

$$P_C(c) = \lim_{t \to \infty} \prod_{i=1}^{t} P_T(s_{i-1}, s_i) \quad (6)$$

In the present invention, the stay duration refers to the total duration of a single video viewing session. For example, when the online video application is a web player, the stay duration begins when the user clicks the "play" button and continues until the video playback ends or until the user actively closes the web player before the video finishes. In conjunction with the exit rate for each second $R_t$, the mathematical expectation value of the stay duration for the chain E(c) satisfies the following formula (7):

$$E(c) = \lim_{t \to \infty} \sum_{i=1}^{t} i * SER_i \qquad (7)$$

Thus, the mathematical expectation value of the stay duration in a given network environment $E_{ST}$ satisfies the following formula (8):

$$E_{ST} = \sum E(c) P_c(c) \qquad (8)$$

Step 104: Selecting the bitrate and CDN that maximize the stay duration expectation for a given user's position and network connection type.

For network video service providers or network operators, the user's position and network connection type are generally uncontrollable or unchangeable, while the video bitrate and CDN can be adjusted. Therefore, in this embodiment, by selecting the bitrate and CDN that maximize the stay duration expectation, the video streaming quality is optimized.

This problem can be viewed as a reinforcement learning problem, as the time period, position, network connection type, CDN, and bitrate constitute the environment to be explored, while adjusting the selected available CDNs and bitrates represents the actions to be taken. This embodiment proposes an ϵ-greedy bandit algorithm to address potential errors in achieving the expected optimal outcomes and to account for possible congestion in the CDNs.

Specifically, when selecting the bitrate and CDN, the algorithm directly chooses the combination that maximizes the stay duration expectation with a probability of (1−ϵ) and randomly selects one from all available CDN and bitrate combinations with a probability of c. In this embodiment, when e is set to 0.02, it achieves the maximum quality improvement.

Figures 3, 4:
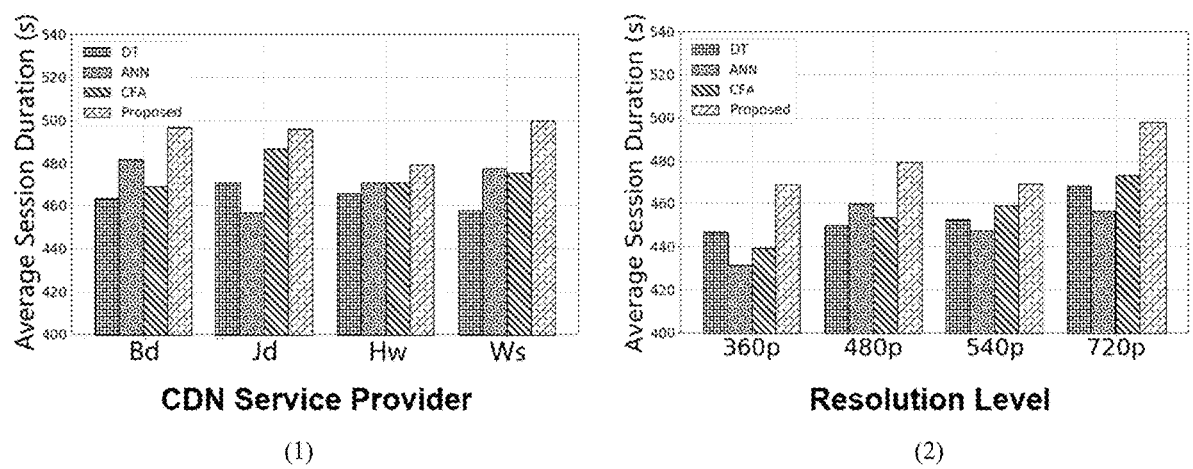
FIG. 3 is a comparison showing the estimation error (%) of average video session duration between the embodiment of the present invention and other comparison methods under (1) different CDN service providers and (2) video resolution levels.
FIG. 4 is a comparison of the final average video session duration obtained after optimization between the embodiment of the present invention and other comparison methods under (1) different CDN service providers and (2) video resolution levels.

In this embodiment, a video streaming quality model is established based on two user behavior metrics: exit rate and stay duration. This overcomes the shortcomings of metrics such as initial frame delay, buffering duration, and frequency, which fail to reflect the user's true viewing experience, while also avoiding the additional costs associated with conducting subjective experiments. To quantify the impact of the network environment on video streaming quality, the method distinguishes different network environments by calculating the transition probabilities and stay duration expectations corresponding to various positions, network connection types, CDNs, and bitrates during different time periods. It evaluates the video streaming quality scores for different bitrates and CDNs specific to various users' positions and network connection types, thereby accurately identifying the bitrate and CDN that optimize the user viewing experience. FIGS. 3(1) and 3(2) illustrate that the embodiment of the present invention provides more accurate estimates of average video session duration compared to other methods under different CDN service providers and video resolution levels. FIGS. 4(1) and 4(2) demonstrate that, after optimization, the embodiment achieves higher average video session duration compared to other methods under the same conditions. Therefore, the video transmission quality evaluation and optimization method and system based on user behavior metrics provided by this invention can significantly enhance video streaming quality.

Figure 2:
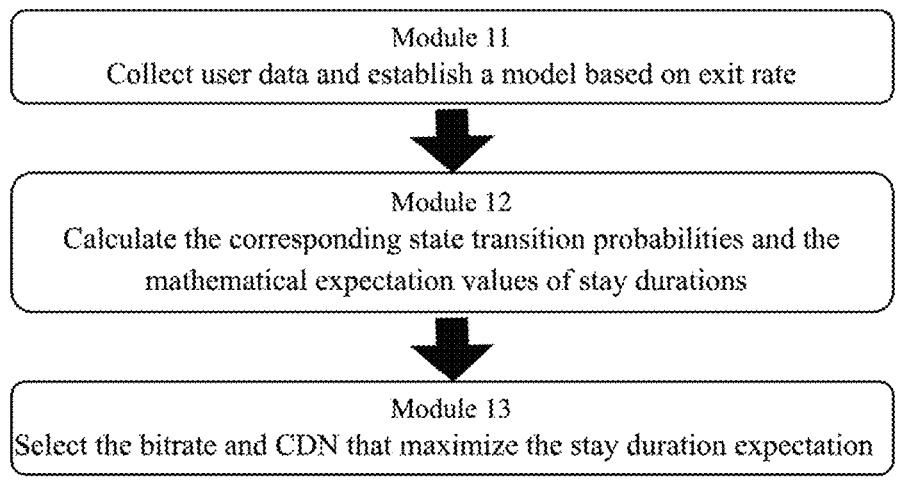
FIG. 2 is a schematic diagram of the video transmission quality evaluation and optimization provided by the embodiment of the present invention.

FIG. 2 is a schematic diagram of video transmission quality evaluation and optimization method and system based on user behavior metrics provided by the embodiment of the present invention. As shown in FIG. 2, the system includes:

Modeling Module 11, configured to acquire the session duration of users watching online videos and to determine whether each second within the session is in a buffering state, thereby establishing an exit rate model for all video sessions;

Evaluation Module 12, configured to differentiate the playing states for each second within sessions under various positions, network connection types, CDNs, and bitrates during different time periods, thereby calculating the corresponding state transition probabilities and the mathematical expectation values of stay durations;

Optimization Module 13, configured to select the bitrate and CDN that maximize the stay duration expectation for a given user's position and network connection type.

In addition, the modeling module 11 is also configured to:

Record the user's session duration when watching online videos ends, or when the user actively exits the application or webpage. According to the playback state of each second during the viewing process, mark the state of that second as "play" or "buffering".

Denote the user exit rate at the t-th second as $SER_t$, and estimate the exit rate using the frequency of exit behaviors in the session samples.

Use a linear regression algorithm to calculate the values of the exit rate model parameters γ and b.

Furthermore, the evaluation module 12 is also configured to:

Calculate the probabilities of the four state transitions based on session samples corresponding to various positions, network connection types, CDNs, and bitrates during different time periods.

Under a given network environment, calculate the generation probabilities of various state chains based on the transition probabilities.

Calculate the mathematical expectation of the stay duration for the state chain based on the exit rate of each second on various state chains.

Use a weighted average method to calculate the mathematical expectation of stay duration in a given network environment based on the generation probabilities of each state chain and their stay duration expectations.

Moreover, the optimization module 13 is further configured to:

Implement the ϵ-greedy bandit algorithm, selecting the bitrate and CDN with a probability of (1-Σ) that results in the longest expected stay duration, and with a probability of ϵ, randomly selecting from all available combinations of CDNs and bitrate levels.

The video streaming quality evaluation and optimization system described in this embodiment can be used to execute the technical solutions of the method embodiment shown in FIG. 1, with similar implementation principles and technical effects, which will not be further elaborated here.

In several embodiments provided by the present invention, it should be understood that the disclosed systems and methods can be implemented in other ways. For example, the described system embodiments are merely illustrative. For instance, the division of units is only a logical functional division, and in actual implementation, there can be other division methods, such as combining multiple units or components or integrating into another system, or some features can be ignored or not executed. Another point is that the coupling or direct coupling or communication connection between the displayed or discussed elements can be through some interfaces, devices, or units, which may be indirect coupling or communication connection, possibly in electrical, mechanical, or other forms.

The units described as separate components may or may not be physically separated. Components displayed as units may or may not be physical units, i.e., they can be located in one place or distributed across multiple network units. Parts or all of the units can be selected as needed to achieve the purpose of this embodiment.

Additionally, in various embodiments of the present invention, the functional units can be integrated into one processing unit, or each unit can exist physically separately, or two or more units can be integrated into one unit. The integrated units can be implemented in hardware form or as hardware plus software functional units.

The integrated units implemented in the form of software functional units can be stored in a computer-readable storage medium. The software functional units stored in a storage medium include several instructions for causing a computer device (can be a personal computer, server, or network device, etc.) or a processor to perform some of the steps of the methods described in various embodiments of the invention. The aforementioned storage mediums include: USB drives, mobile hard disks, Read-Only Memory (ROM), Random Access Memory (RAM), disks, or optical discs, and various other media that can store program codes.

Those skilled in the art can clearly understand that, for convenience and simplicity of description, only the division of the above functional modules is illustrated. In actual applications, the above functions can be assigned to different functional modules as needed, i.e., the internal structure of the device can be divided into different functional modules to complete all or part of the functions described above. The specific working process of the described device can refer to the corresponding process in the method embodiments mentioned earlier, which will not be further elaborated here.

The embodiment of the invention applies a linear regression algorithm to calculate the values of the exit rate model parameters γ and b and applies the ϵ-greedy bandit algorithm to make optimization decisions. Other types of machine learning, deep learning, or reinforcement learning algorithms can also achieve the purpose of parameter estimation and optimization decision-making, but the experimental effect of the algorithm used in the embodiment of the invention is optimal.

Finally, it should be noted that the above embodiments are merely illustrative of the technical solutions of the present invention and are not intended to limit it. Although the present invention has been described in detail with reference to the aforementioned embodiments, those skilled in the art should understand that modifications can still be made to the technical solutions described in the aforementioned embodiments, or some or all of the technical features can be replaced equivalently. These modifications or replacements do not cause the essence of the corresponding technical solutions to depart from the spirit and scope of the technical solutions of each embodiment of the present invention.

The invention claimed is:

1. A video transmission quality evaluation and optimization method based on user behavior, comprising:
   acquiring a session duration of users watching online videos under various positions, network connection types, Content Distribution Networks (CDNs"), and bitrates during different time periods, as well as a playing state for each second within a session;
   establishing an exit rate model based on the session duration and the playing state for each second;
   calculating a state transition probabilities for play-to-play, play-to-buffering, buffering-to-play, and buffering-to-buffering based on a playing states of every two adjacent seconds;
   calculating an expected stay duration corresponding to the various positions, network connection types, CDNs, and bitrates during the different time periods based on the state transition probabilities and exit rates;
   selecting a bitrate and CDN that result in a longest expected stay duration for a given user's position and network connection type.

2. The method according to claim 1, wherein the said acquiring the session duration of users watching online videos under various positions, network connection types, CDNs, and bitrates during different time periods, and the playing state for each second within the session, including:
   recording the session duration of each of the users when watching online videos ends, or when a user actively exits an application or webpage; marking the playing state of each second during the viewing process as "play" or "buffering".

3. The method according to claim 1, wherein the said establishing an exit rate model based on the session duration and the playing state for each second, including:
   denoting an exit rate at an t-th second as $SER_t$, estimating the exit rate using a frequency of exit behaviors according to the law of large numbers in data analysis, based on a total number of session samples $SER_t$, a number of samples not exited at (t−1) seconds $S_{t-1}$, and the number of samples not exited at t seconds $S_t$, $$SER_t = \frac{s_{t-1} - s_t}{s_0},$$

using regression analysis to derive a functional relationship between the exit rate of two adjacent seconds and the state transition of these two seconds $(s_{t-1}, s_t)$:
   $SER_t = \gamma SER_{t-1} + b(s_{t-1}, s_t)$;
   deriving the exit rate at any given time: $c = <s_0, s_1, s_2, \ldots, s_t, \ldots>$
   for any playback state chain $c = <s_0, s_1, s_2, \ldots, s_t, \ldots>$.

4. The method according to claim 1, wherein the said calculating the state transition probabilities for play-to-play, play-to-buffering, buffering-to-play, and buffering-to-buffering, including:
   deriving a state transition probability between any two states i and j:

$$P_T(i, j) = \frac{N(i, j)}{N(i)}$$

based on a number of samples containing the subsequence (i,j) N(i,j), and a sum of these samples and those that transition to states other than j N(i).

5. The method according to claim 1, wherein the said calculating the expected stay duration corresponding to various positions, network connection types, CDNs, and bitrates during different time periods, including:
deriving a generation probability under any given network environment, for any playback state chain c=<$s_0$, $s_1$, $s_2$, ..., $s_t$, ...>,:

$$P_C(c) = \lim_{t \to \infty} \prod_{i=1}^{t} P_T(s_{i-1}, s_i),$$

where $P_T(s_{i-1}, s_i)$ represents a state transition probability between states $s_{i-1}$ and $s_i$; the expected stay duration of a chain:

$$E(c) = \lim_{t \to \infty} \sum_{i=1}^{t} i * SER_i,$$

and the expected stay duration of a network environment:

$$E_{ST} = \sum E(c) P_c(c).$$

6. The method according to claim 1, wherein the said selecting the bitrate and CDN that result in the longest expected stay duration, including:
applying an ϵ-greedy bandit algorithm, selecting the bitrate and CDN that result in the longest expected stay duration with a probability of (1−ϵ), and randomly selecting from all available combinations of CDNs and bitrate levels with a probability of ϵ.

7. A video transmission quality evaluation and optimization system based on user behavior, comprising:
a modeling module comprising instructions stored on a non-transitory computer readable medium, the instructions when executed by a processor cause the processor to acquire a session duration of users watching online videos and whether each second of a session is in a buffering state, thereby establishing an exit rate model for all video sessions;
an evaluation module comprising instructions stored on a non-transitory computer readable medium, the instructions when executed by a processor cause the processor to distinguish whether each second of a session is in a buffering state under various positions, network connection types, Content Distribution Networks (CDNs"), and bitrates during different time periods, thus calculating a corresponding transition probabilities and an expected stay duration;
an optimization module comprising instructions stored on a non-transitory computer readable medium, the instructions when executed by a processor cause the processor to select a bitrate and CDN that result in a longest expected stay duration for a given user's position and network connection type.

8. The system according to claim 7, wherein the modeling module is further configured to:
record the session duration of each of the users when watching online videos ends or when a user actively exits an application or webpage; mark a state of each second during the viewing process as "play" or "buffering";
denote an exit rate at an t-th second as $SER_t$, estimate the exit rate using the frequency of exit behaviors in the session samples;
use a linear regression algorithm to calculate values of the exit rate model parameters, γ and b.

9. The system according to claim 7, wherein the evaluation module is further configured to:
calculate the transition probabilities of four state transitions based on session samples corresponding to the various positions, network connection types, CDNs, and bitrates during different time periods;
calculate generation probabilities of various state chains based on the transition probabilities under a given network environment;
calculate the expected stay duration for the state chain based on an exit rate of each second on the various state chains;
use a weighted average method to calculate the expected stay duration in a given network environment based on the generation probabilities of each state chain and their stay duration expectations.

10. The system according to claim 7, wherein the optimization module is further configured to:
implement an ϵ-greedy bandit algorithm, selecting the bitrate and CDN with a probability of (1−ϵ) that results in the longest expected stay duration, and with a probability of ϵ, randomly selecting from all available combinations of CDNs and bitrate levels.

* * * * *